United States Patent
Frawley

[19]

[11] Patent Number: 6,122,907
[45] Date of Patent: Sep. 26, 2000

[54] IR SUPPRESSOR

[75] Inventor: Robert C. Frawley, Huntington, Conn.

[73] Assignee: Sikorsky Aircraft Corporation, Stratford, Conn.

[21] Appl. No.: 09/075,353

[22] Filed: May 11, 1998

[51] Int. Cl.[7] .................................................. F02K 3/04
[52] U.S. Cl. .................. 60/264; 60/266; 239/265.17; 239/265.19
[58] Field of Search ................ 60/39.5, 265, 266, 60/264; 239/265.17, 265.19

[56] References Cited

U.S. PATENT DOCUMENTS

| | | | |
|---|---|---|---|
| 2,690,886 | 10/1954 | Laskowitz | 244/7 |
| 3,212,700 | 10/1965 | Guienne et al. | 230/103 |
| 3,628,885 | 12/1971 | Sidenstick et al. | 416/97 |
| 3,685,612 | 8/1972 | Bertin | 181/33 HC |
| 3,921,906 | 11/1975 | Nye et al. | 239/127.3 |
| 3,926,373 | 12/1975 | Viets | 239/265.17 |
| 3,981,448 | 9/1976 | Demogenes et al. | 239/127.3 |
| 4,007,587 | 2/1977 | Banthin et al. | 60/204 |
| 4,018,046 | 4/1977 | Hurley | 60/264 |
| 4,084,161 | 4/1978 | Manning et al. | 343/18 A |
| 4,095,417 | 6/1978 | Banthin | 60/39.5 |
| 4,198,817 | 4/1980 | Fujita et al. | 60/319 |
| 4,215,537 | 8/1980 | Hurley | 60/264 |
| 4,312,480 | 1/1982 | Miller | 239/127.3 |
| 4,800,715 | 1/1989 | Conway | 60/39.5 |
| 4,830,315 | 5/1989 | Presz, Jr. et al. | 244/200 |
| 4,835,961 | 6/1989 | Presz, Jr. et al. | 60/264 |
| 4,864,819 | 9/1989 | Steyer | 60/264 |
| 4,924,228 | 5/1990 | Novak et al. | 342/2 |
| 5,269,132 | 12/1993 | Loucks | 60/204 |
| 5,699,965 | 12/1997 | Amelio | 239/127.3 |
| 5,992,140 | 11/1999 | Hammond et al. | 60/262 |

FOREIGN PATENT DOCUMENTS

| | | | |
|---|---|---|---|
| 0036643 | 9/1981 | European Pat. Off. | |
| 2338380 | 8/1977 | France | |
| 1070448 | 12/1959 | Germany | 239/265.17 |
| 3129305 C2 | 1/1989 | Germany | B64D 33/04 |
| 312023 | 5/1929 | United Kingdom | |

*Primary Examiner*—Charles G. Freay
*Assistant Examiner*—Ehud Gartenberg
*Attorney, Agent, or Firm*—Brian A. Collins

[57] ABSTRACT

An IR Suppressor (20) operative to suppress the infrared signature radiated from the high-temperature exhaust of an engine (12) and comprising a primary exhaust manifold (22), first and second mixing ducts (24a, 24b), and a secondary flow shroud (26). More specifically, the primary exhaust manifold (22) includes an elongate duct (28) adapted for receiving a primary flow of the high-temperature engine exhaust from the engine and at least two high aspect ratio nozzles (30a, 30b) integrated in combination with the elongate duct (28). The high aspect ratio nozzles (30a, 30b) are positioned so as to define at least two outlets at the same axial station along the length of the elongate duct (28). The first and second mixing ducts (24a, 24b) are disposed over the high aspect ratio nozzles (30a, 30b) so as to form a mixer/ejector defining at least two ejector inlets (44). The secondary flow shroud (26) is disposed over the mixer/ejector and defines at least one longitudinal inlet (56) disposed in fluid communication with at least one the ejector inlets (44). In operation, the primary flow of engine exhaust is discharged from the high aspect ratio nozzles (30a, 30b) and entrains a secondary flow of ambient air through the longitudinal inlet (56) of the secondary flow shroud (26). The resulting mixed flow is discharged from the IR Suppressor (20) along at least two distinct planes which serve, inter alia, to reduce the envelope of the IR Suppressor (20) while, furthermore, improving suppressor performance.

19 Claims, 4 Drawing Sheets

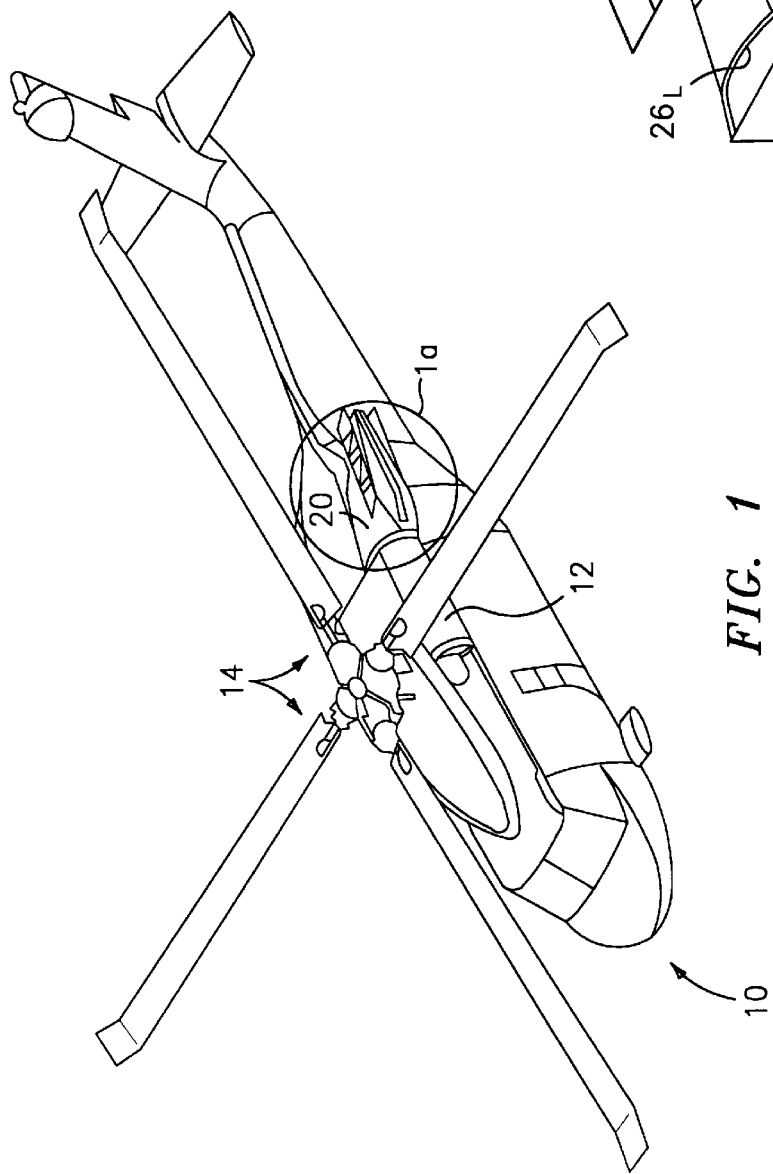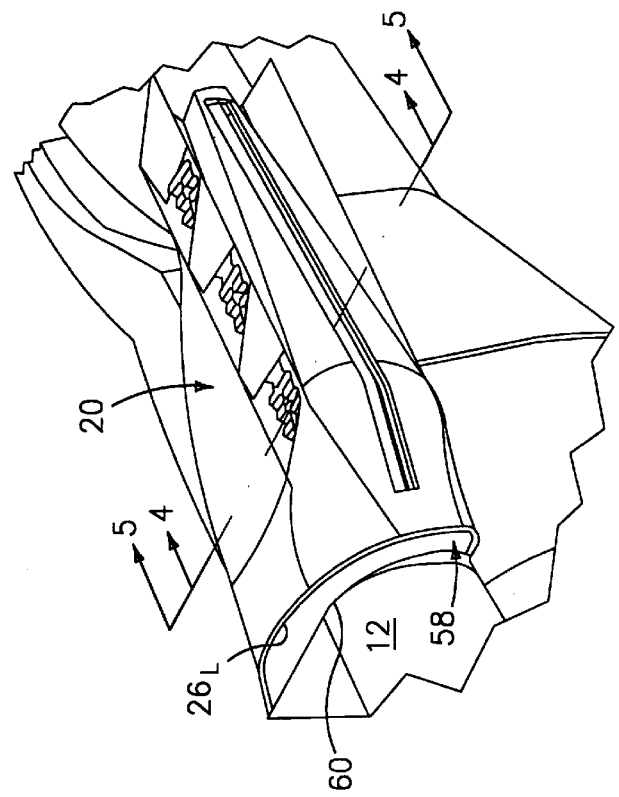
*FIG. 1*
*FIG. 1a*

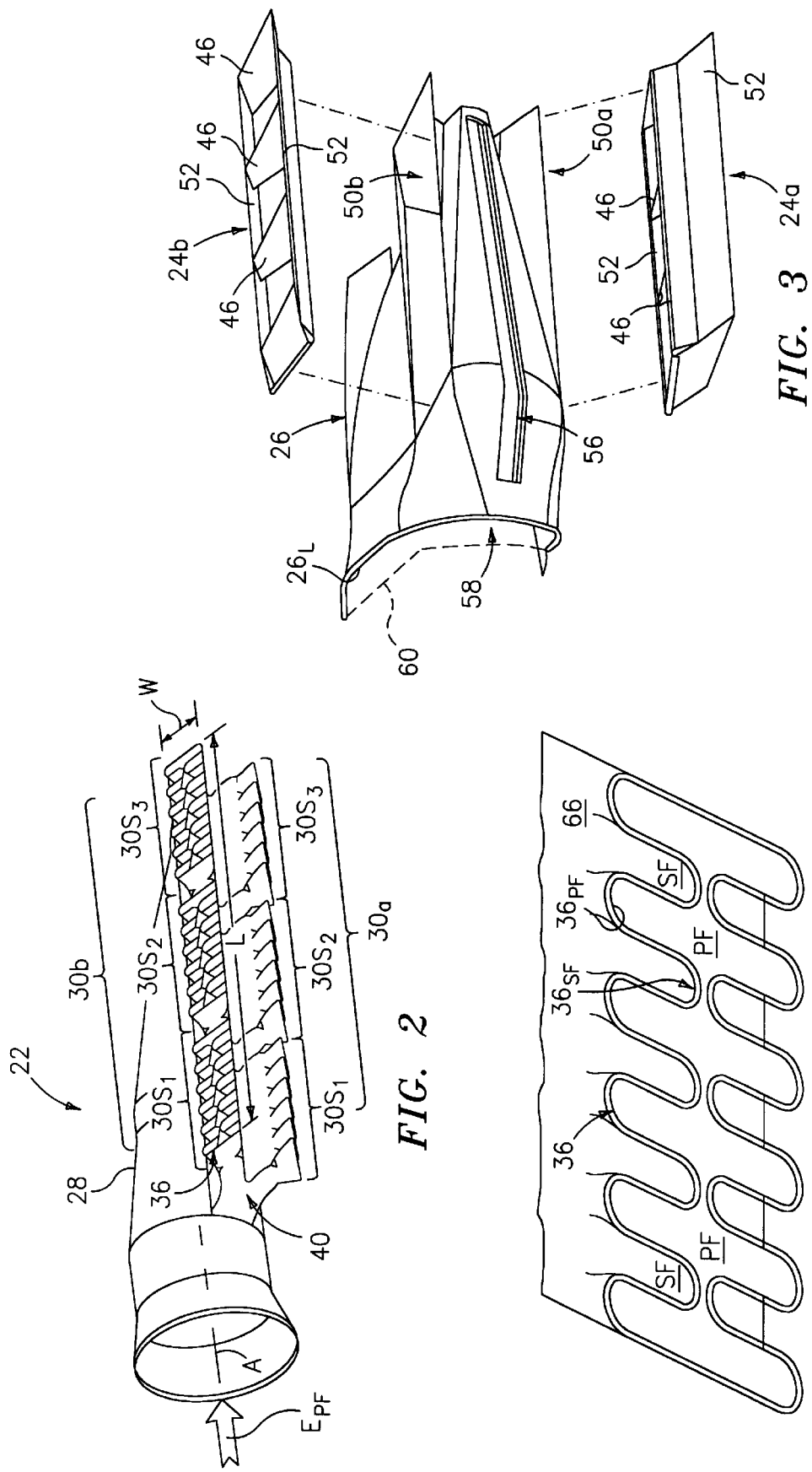

IR SUPPRESSOR

TECHNICAL FIELD

This invention is directed to infrared suppression systems, and more particularly, to a suppression system which, inter alia, is compact in design, minimizes the surface area and temperature of engine exhaust impinging on adjacent support structure, and reduces the overall infrared signature of an aircraft/vehicle as compared to prior art suppression systems.

BACKGROUND OF THE INVENTION

The exhaust plume of gas turbine engines, e.g., military aircraft engines, is a source of high infrared energy which may be used for targeting/tracking purposes by heat seeking missiles and/or various forms of infrared imaging systems, e.g., Night Vision Goggles (NVGs). With respect to the former, a heat seeking missile obtains directional cues from the infrared energy wherein the intensity, e.g., temperature, thereof is determinative of the accuracy, and consequently, lethality of the heat seeking missile. Regarding the latter, infrared imaging systems amplify the infrared energy by a factor of about 10,000 and may be used by hostile forces for early detection and/or targeting of surface-to-air/air-to-air missiles. Accordingly, it is highly desirable to reduce the infrared emissions (also referred to as the IR signature) of such engines to a practical minimum to avoid detection, acquisition and/or tracking by enemy threats/forces.

Various infrared suppression systems have been designed and fielded which effect mixing of low temperature ambient air with the high temperature engine exhaust to reduce the IR signature radiated therefrom. Generally, it is the principle objectives of such systems to: (a) reduce the infrared energy below a threshold level (e.g., a level capable of being sensed by the perceived threat), (b) maintain engine performance, and, (c) minimize the weight penalties associated therewith. Secondary objectives may include: (i) minimizing system or configuration complexity to reduce fabrication costs, (ii) minimizing the external aerodynamic drag produced by such IR suppressors, and/or (iii) suppressing the acoustic emissions emanating therefrom which may also be a source of detection.

Amelio U.S. Pat. No. 5,699,965 describes an infrared suppressor for a gas turbine engine which employs a high aspect ratio duct/nozzle to produce a "thin film" or sheet of engine exhaust. The nozzle is disposed in combination with a mixing duct for pumping and, consequently, mixing cool ambient air with the high temperature engine exhaust. The thin film of engine exhaust produces a large shear or surface area for improving the efficacy of mixing and, consequently, the degree of IR suppression. Optionally, Amelio discloses a means for rotating the nozzle/duct so as to change the "line-of-sight" relative to radar scanning/heat seeking threats and/or to change the direction of the exhaust flowing therefrom. With respect to the latter, it is oftentimes desirable to prevent impingement of hot engine exhaust on adjacent structure, e.g., an aircraft fuselage or vehicle skin, so as to avoid creating another "hot spot" for detection, i.e., in addition to the primary source associated with the nozzle/exhaust plume. By rotating the duct, Amelio controls the direction of the engine exhaust and its interaction with other external influences, e.g., the downwash of a helicopter main rotor, to reduce the overall IR signature of the aircraft/vehicle.

While the teachings of Amelio significantly reduce the IR signature radiated from the engine, such IR suppressors have certain drawbacks and limitations. Firstly, and perhaps most significantly, such IR suppressors are limited by the envelope restrictions of a particular application. That is, the elongate manifold thereof, which may require as much as twelve (12) feet to provide ample flow area for the engine exhaust, is not readily adaptable to smaller, more compact, aircraft/vehicles. Secondly, the efficiency of such IR suppressors is limited by the surrounding flow field. That is, the pumping action of such IR suppressors is easily stalled/disrupted by relatively small crossflow disturbances of ambient air, e.g., rotor downwash. Thirdly, when considering the primary embodiment of Amelio wherein the IR Suppressor is fixed/non-rotating with respect to a helicopter/aircraft fuselage, it will be appreciated that, for a particular roll attitude, the entire nozzle is vulnerable to IR scanning radar. That is, since the nozzle is linear there exists one angle wherein the fill length of the nozzle is viewable by IR scanning devices. Accordingly, it is at this angle that the IR signature is maximum. Finally, when considering the alternate embodiment wherein the IR suppressor is rotatable, it will be appreciated that the inclusion of actuators to rotate the duct/nozzle may be prohibitive in terms of weight, present reliability issues, and pose packaging difficulties.

A need, therefore, exits for providing an Infrared Suppression System which is compact in design, rapidly and thoroughly diffuses the IR energy emitted/radiated from a gas turbine engine, provides efficient mixing/pumping irrespective the crossflow disturbances of the surrounding flow field, minimizes impingement of engine exhaust onto adjacent structure, and reduces the overall IR signature of the aircraft/vehicle for a given viewing/azimuth angle.

SUMMARY OF THE INVENTION

It is an object of the present invention to provide an InfraRed (IR) Suppressor operative for reducing the infrared radiation emitted by a gas turbine engine while maintaining a minimum design envelope.

It is another object of the present invention to provide such an IR Suppressor forming a mixer/ejector which provides efficient mixing/pumping irrespective crossflow disturbances of the surrounding flow field.

It is yet another object of the present invention to provide such an IR suppressor which minimizes impingement of engine exhaust onto adjacent structure.

It is yet another object of the present invention to provide such an IR suppressor which reduces the overall IR signature of the aircraft/vehicle for a given viewing/azimuth angle.

These and other objects of the present invention are achieved by an IR Suppressor operative to suppress the infrared signature radiated from the high-temperature exhaust of an engine and comprising a primary exhaust manifold, first and second mixing ducts, and a secondary flow shroud. More specifically, the primary exhaust manifold includes an elongate duct adapted for receiving a primary flow of the high-temperature engine exhaust from the engine and at least two high aspect ratio nozzles integrated in combination with the elongate duct. The high aspect ratio nozzles are positioned so as to define at least two outlets at the same axial station along the length of the elongate duct. The first and second mixing ducts are disposed over each of the high aspect ratio nozzles so as to form a mixer/ejector defining at least two ejector inlets. The secondary flow shroud is disposed over the mixer/ejector and defines at least one longitudinal inlet disposed in fluid communication with at least one the ejector inlets. In operation, the primary flow of engine exhaust is discharged from the high aspect ratio nozzles and entrains a secondary flow of ambient air through the longitudinal inlet of the secondary flow shroud. The resulting mixed flow is discharged from the IR Suppressor along at least two distinct planes which serve, inter alia, to reduce the envelope of the IR Suppressor while, furthermore, improving suppressor performance.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 1 is a perspective view of a helicopter illustrating an exemplary installation of an IR Suppressor according to the present invention;

FIG. 1a is an enlarged view of the IR Suppressor shown in FIG. 1;

FIG. 2 is an isolated perspective view of a primary exhaust manifold used in the IR Suppressor according to the present invention, which primary exhaust manifold includes an elongate duct for delivering a flow of engine exhaust to at least two high aspect ratio nozzles;

FIG. 3 depicts an isolated perspective view of a secondary flow shroud and mixing ducts used in the IR Suppressor according to the present invention;

FIG. 6 depicts an end view of one of the high aspect ratio nozzles, i.e., one segment thereof, for viewing the preferred nozzle configuration.

BEST MODE FOR CARRYING OUT THE INVENTION

Figure 4:
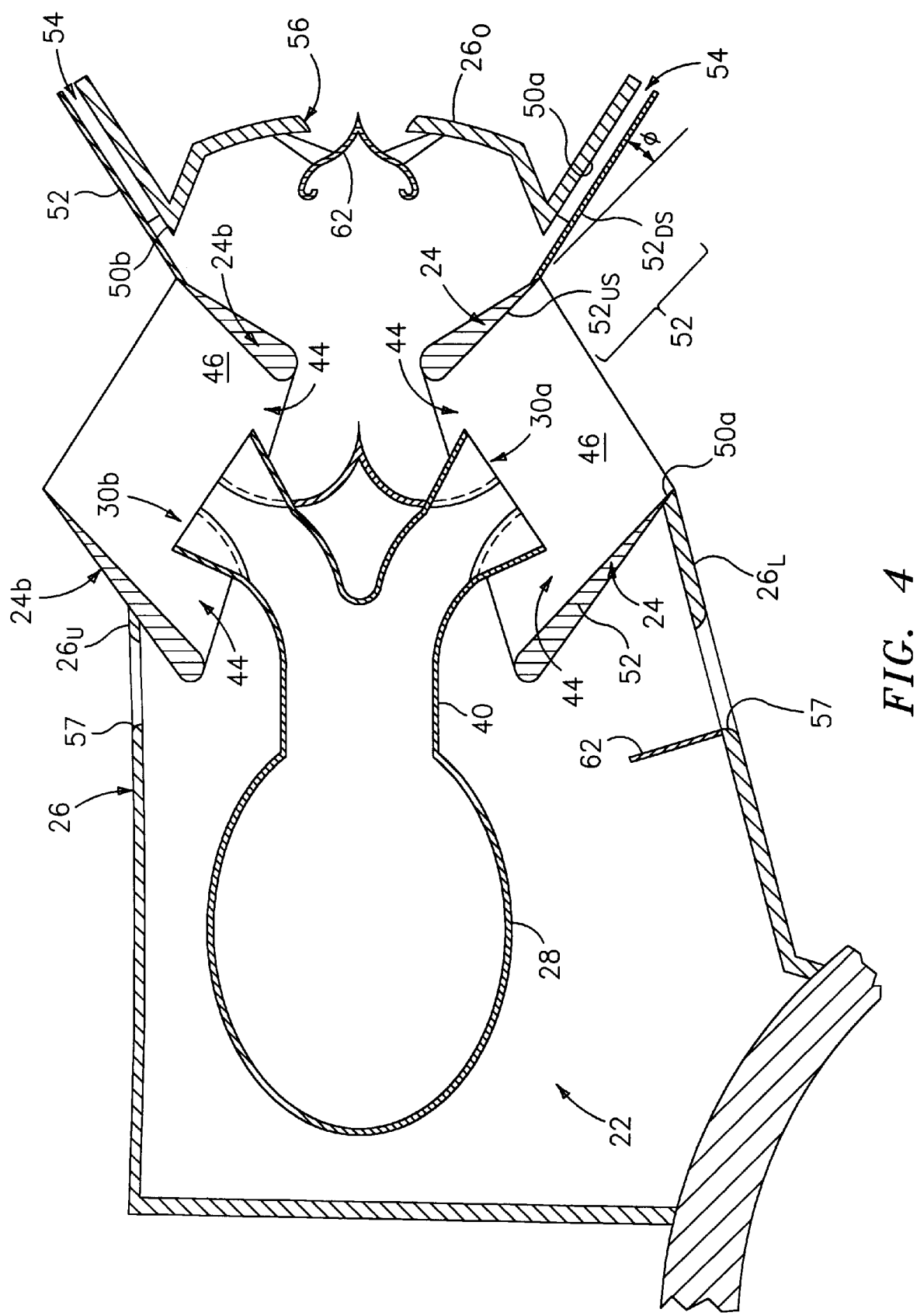
FIG. 4 depicts a cross-sectional view taken along line 4—4 of FIG. 1a for depicting the relevant internal details of the inventive IR Suppressor.

The exemplary embodiments of the present invention will be described in the context of a helicopter gas turbine engine, though, it will be appreciated that the teachings described herein are applicable to any turbo-shaft engine wherein the maximization of shaft horsepower is a principle design objective. This application is to be distinguished from other engine designs, such as turbo-jet or turbo-fan engines, wherein the maximization of thrust, rather than shaft horsepower, is a key design objective.

Referring now to the drawings wherein like reference characters identify corresponding or similar elements throughout the several views, FIGS. 1 and 1a show a helicopter 10 having a gas turbine engine 12 (only one of two such engines is viewable in the perspective shown) for driving a main rotor system 14. An IR Suppressor 20 in accordance with the teachings of the invention is disposed in combination with the aft end of the gas turbine engine 12 and is operative to suppress the InfraRed (IR) signature radiated from the high-temperature exhaust of the engine 12. In the context used herein, "to suppress" means that the IR signature emanating from the gas turbine engine 12 is reduced below some predetermined threshold value which is indicative of the acquisition, tracking and/or targeting capability of a particular IR threat.

In FIGS. 2 and 3, the IR Suppressor 20 includes a primary exhaust manifold 22, first and second mixing ducts 24a, 24b, and a secondary flow shroud 26. Before discussing the functional interaction of the various elements, i.e., the effects on the exhaust flow, a brief structural and geometric description of each element follows.

The primary exhaust manifold 22 (see in FIG. 2) defines an elongate duct 28 which is adapted at an inboard end to receive a primary flow of high temperature engine exhaust $E_{PF}$ from the gas turbine engine (not shown). The elongate duct 28 tapers in cross-sectional area for delivering a uniform flow of engine exhaust $E_{PF}$ to at least two (2) high aspect ratio nozzles 30a, 30b. In the context used herein "high aspect ratio" means that the ratio of the maximum nozzle length L to the maximum nozzle width W is greater than about 6.0. In the broadest interpretation of the invention, the high aspect ratio nozzles 30a, 30b are integrated in combination with the elongate duct 28 so as to define at least two outlets at the same axial station along the length of the duct 28. In the context used herein "axial station" means a cross-sectional plane normal to longitudinal axis A of the duct 28.

In the preferred embodiment, each of the high aspect ratio nozzles 30a, 30b comprises multiple segments $30s_1$, $30s_2$, $30s_3$ which are tandemly or linearly arranged. Furthermore, each of the segments $30s_1$, $30s_2$, $30s_3$ is preferably equal in length and width to permit a substantially equal flow of exhaust. Moreover, each of the high aspect ratio nozzles 30a, 30b comprises a plurality of adjoined lobes 36 for improving the efficacy of the engine exhaust dilution and, consequently, the degree of IR suppression. The import of such nozzle segments $30s_1$, $30s_2$, $30s_3$ and adjoined lobes 36 will be discussed in subsequent paragraphs.

In the preferred embodiment, the primary exhaust manifold 22 includes a bifurcated transition 40 disposed between and connecting each of the high aspect ratio nozzles 30a, 30b to the elongate duct 28. While in the broadest sense of the invention the transition 40 is non-essential, the transition 40 provides a lateral extension of the elongate duct 28 so as to situate the nozzles 30a, 30b outwardly away from the helicopter fuselage (not shown in FIG. 2).

In FIGS. 2–4, the first and second mixing ducts 24a, 24b are disposed over and proximal to the high aspect ratio nozzles 30a, 30b so as to define a mixer/ejector (FIG. 4 shows the various components assembled in combination). As used herein, the term "mixer/ejector" means the combination of the primary exhaust manifold 22 and the mixing ducts 24a, 24b. More specifically, the mixing ducts 24a, 24b are situated relative to nozzles 30a, 30b such that an ejector inlet 44 is produced therebetween. Furthermore, each of the mixing ducts 24a, 24b may include splitter walls 46 which, when assembled in combination with the nozzles 30a, 30b lie between the various nozzle segments $30s_1$, $30s_2$, $30s_3$. Moreover, each of the mixing ducts 24a, 24b may include a downstream sidewall $52_{DS}$ (FIG. 4) which forms an angle φ relative to an upstream sidewall $52_{US}$. The import of the diverging sidewall section $52_{DS}$ will become apparent when discussing the functional interaction of the various components.

In FIGS. 3 and 4, the secondary flow shroud 26 is disposed over the mixer/ejector and defines a plurality of inlets and passages adapted for receiving a secondary flow of ambient air. More specifically, the secondary flow shroud 26 defines two apertures 50a, 50b for accepting the outlet ends of the mixing ducts 24a, 24b. In the preferred embodiment, the apertures 50a, 50b may be oversized relative to the sidewalls 52 of the mixing ducts 24a, 24b so as to define cooling passages 54 therebetween.

The secondary flow shroud 26 also defines at least one longitudinal inlet 56 which is disposed in fluid communication with at least one ejector inlet 44. In the preferred embodiment, the longitudinal inlet 56 is an elongate slot disposed along an outwardly facing surface $26_O$ of the shroud 26 and is spatially positioned so as to lie between the high aspect ratio nozzles 30a, 30b. Furthermore, auxiliary longitudinal inlets 57 may be defined along the upper and/or lower surfaces $26_U$ and $26_L$, respectively, of the shroud 26 proximal to the backside of one or both of the sidewalls 52. The secondary flow shroud 26 may also include a forward inlet 58 (also see FIG. 1b) which is defined by the forward lip $26_L$ of the shroud 26 and a portion of the upper pylon 60 (shown in phantom in FIG. 3) of the helicopter fuselage. Furthermore, the shroud 26 may comprise one or more blocking vanes 62 proximal to the one or both of the inlets 56, 58 to occlude viewing of the mixer/ejector from a direct line-of-sight.

Figure 5:
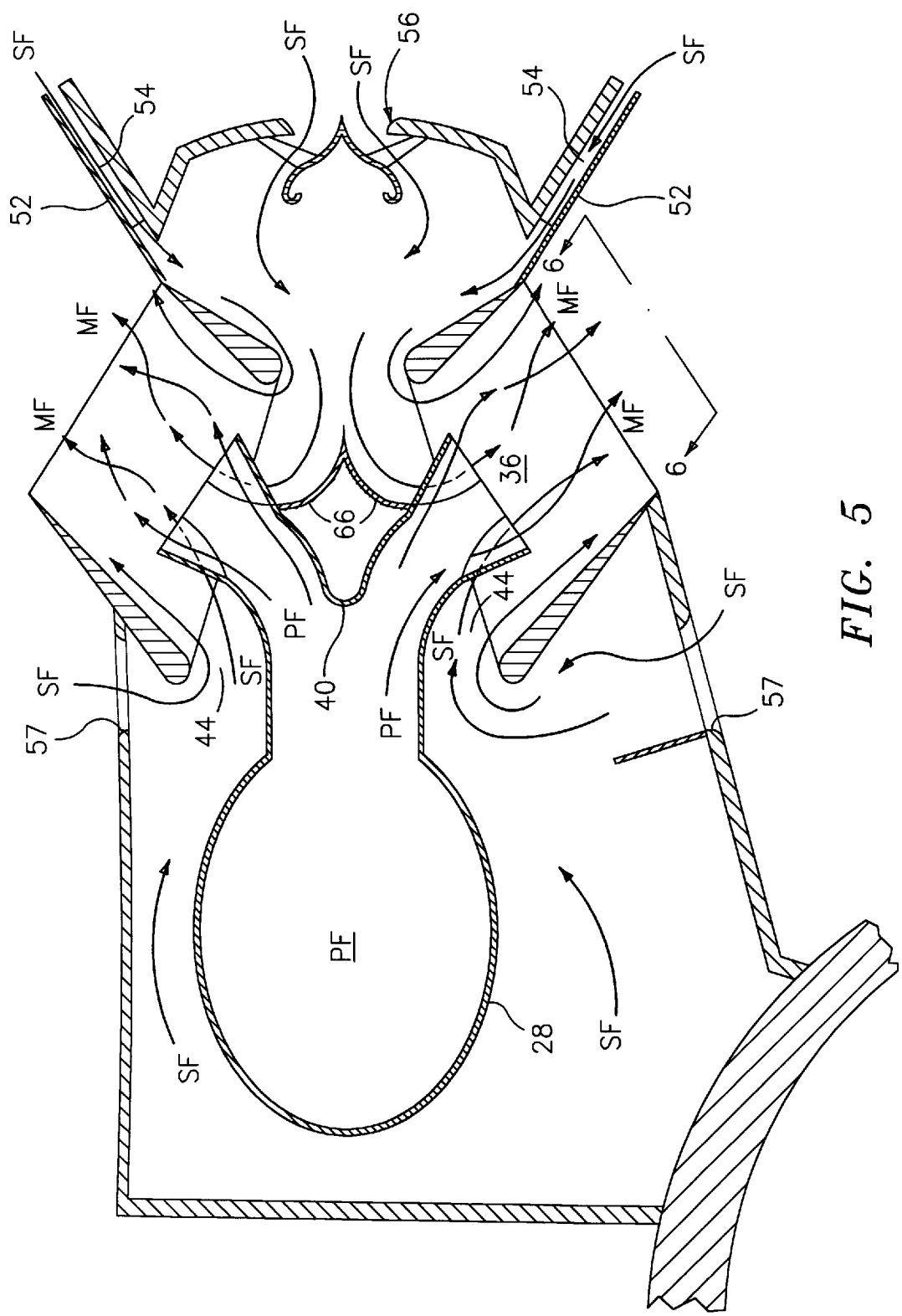
FIG. 5 depicts a cross-sectional view taken along line 5—5 of FIG. 1a for pictorially illustrating the various the flow paths within and surrounding the IR Suppressor.

In operation, and referring to FIG. 5, a primary flow PF of high temperature engine exhaust $E_{PF}$, produces a high velocity, low pressure region (commonly known as a "Venturi") at the outlet of the high aspect ratio nozzles 30a, 30b. The primary flow PF entrains a secondary flow SF of ambient air from the various passages 54 and inlets 56, 57, 58. More specifically, in a hovering operating mode, the principle path for the secondary flow SF is through the longitudinal inlets 56, 57, while in forward flight, the principle path is through the forward inlet (not seen in FIG. 5). Additionally, the secondary flow SF passes through the passages 54 to convectively cool the sidewalls 52 of the mixing ducts 26a, 26b. Collectively, the secondary flow SF, whether entering via the inlets 56, 57, 58 or passages 54, feeds the ejector inlets 44. Turning vanes 66 may also be employed to direct the secondary flow SF to the ejector inlets 44. In the preferred embodiment, the turning vanes 66 are disposed in combination with the bifurcated transition of the elongate manifold 28.

In FIGS. 5 and 6, the adjoined lobes 36 define a primary flow trough $36_{PF}$ (FIG. 6) for channeling the high energy primary flow PF, and a secondary flow trough $36_{SF}$ for channeling the low energy secondary flow SF of ambient air. The primary and secondary flow troughs $36_{PF}$, $36_{SF}$ are alternately disposed about the periphery of the respective nozzle segments such that thin sheets of the high energy primary flow PF: (i) flow from the trough outlets, (ii) transfer kinetic energy to the low energy secondary flow SF, and, (iii) entrain/mix the secondary flow SF with the primary flow PF. Aside from simple viscous or shear mixing, the adjoined lobes 36 produce axial vortices which rapidly admix the primary and secondary flows PF, SF. As such, the adjoined lobes 36 function to augment thrust while rapidly and thoroughly mixing the primary and secondary flows PF, SF for ameliorating the degree of IR suppression. Various nozzle configurations of the type described may be used including those described and depicted in Presz et al. U.S. Pat. Nos. 4,835,961 and 4,830,315.

In the described embodiment, the mixed flow MF is directed at two distinct angles relative to the horizontal, i.e., one of the nozzles 30a directing the flow downwardly at about −45 degrees, and the other of the nozzles directing the flow upwardly at about +45 degrees (the precise angles are typically driven by other design criteria such as momentum drag considerations). In the preferred embodiment, it is desirable to turn the mixed flow MF away from the fuselage structure so as to avoid impingement thereon. As mentioned in the Background of the Invention, such impingement can have the effect of creating another "hot spot" for detection. The combination of the high aspect ratio nozzles and the diverging sidewalls 52 effectively turns and directs the flow away from the aircraft fuselage.

The IR Suppressor 20 provides several distinct advantages which, for a particular design application, may provide the only suitable design solution. Firstly, and referring collectively to FIGS. 2–5, by forming rows of high aspect ratio ducts 30a, 30b, e.g., in juxtaposition, the IR Suppressor 20 may be substantially smaller than prior art "thin film" suppression systems. For example, for an elongate manifold having three rows of ducts, the IR Suppressor may be one-third the length of a conventional thin film suppression system. Secondly, the IR Suppressor 20 is less susceptible to crossflow disturbances through the use of the secondary flow shroud 26. More specifically, in a hover mode of operation, i.e., when the IR Suppressor 20 is stationary, the secondary flow shroud 26 prevents crossflow disturbances from, for example, the rotor downwash such that the mixer/ejector efficiently draws and pumps ambient air. In a forward flight operating mode, when crossflow disturbances are prone to stall/disrupt the flow through the mixer/ejector, the forward inlet 58 provides high pressure ram air to augment the pumping action of the mixer/ejector. Thirdly, the IR Suppressor avoids impingement of engine exhaust onto adjacent structure by discharging the flow upwardly and/or outwardly away from the fuselage. More specifically, the upper nozzle 30b directs the mixed flow into the rotor downwash while the diverging duct wall 52 causes the flow to turn outwardly away from the fuselage.

Finally, in the preferred embodiment, the IR Suppressor 20 employs several mechanisms for reducing the overall IR signature of the rotorcraft. Firstly, and perhaps most significantly, by discharging the flow at different angles, or along distinct planes, relative to the horizon, only a portion of the mixing duct geometry is viewable for a given azimuth angle. That is, for the described embodiment, only one half of the total exhaust geometry, i.e., only one of the high aspect ratio nozzles 30a or 30b and its respective mixing duct 24a or 24b, is viewable for a given azimuth angle. Secondly, the IR Suppressor 20 employs several passages 54 and/or elongate inlets 57 which causes the secondary flow SF to "scrub" and convectively cool the sidewalls 52 of the mixing ducts 24a, 24b. Thirdly, the IR Suppressor 20 employs blocking vanes 62 so as to prevent a direct line-of-sight to hot internal components such as the primary exhaust manifold 22. Fourthly, the splitter walls 46 and segmented nozzles $30s_1$, $30s_2$, $30s_3$ produce structure which block direct line-of-sight viewing into the primary exhaust manifold 22 from certain predefined azimuth angles, i.e., along the length of the nozzles 30a, 30b. Finally, the high aspect ratio nozzles 30a, 30b employ adjoined lobes 36 to rapidly and thoroughly admix the primary and secondary flows, and consequently, improve the degree of IR suppression.

Although the invention has been shown and described with respect to exemplary embodiments thereof, it should be understood by those skilled in the art that other changes, omissions and additions may be made therein and thereto, without departing from the spirit and scope of the present invention. For example, while the IR Suppressor shows three segments which, in combination, define a single high aspect ratio nozzle, it should be appreciated that the nozzles may comprise a single or multiple segments. While the described embodiment shows two high aspect ratio nozzles 30a, 30b having equal length, it should be understood that the one of the nozzles may be shorter or longer than the other nozzle(s). Moreover, while the described embodiment depicts each nozzle 30a and 30b beginning and terminating at the same axial station, it should be appreciated that the nozzles may be axially staggered relative to one another. While the preferred embodiment of the invention employs blocking vanes 62 and splitter walls 46 to prevent direct line-of-sight viewing into the primary exhaust manifold, it should be appreciated that such structures are optional and/or will be modified for the specific application. While the invention preferably employs both a lateral and forward inlets 56 and 58, respectively, it will be appreciated that, for other applications, the use of a forward inlet may not be necessary or advantageous.

While the preferred embodiment employs adjoined lobes 36 to rapidly admix the primary and secondary flows PF, SF, it will be appreciated that other nozzle configurations may be employed. For example, nozzles which may be used include a linear nozzle such as that shown and described in Amelio et al. U.S. Pat. No. 5,699,965, or a reflective lobed configuration such as those depicted in Presz et al. U.S. Pat. Nos. 4,835,961 and 4,830,315.

What is claimed is:

1. An IR Suppressor (20) operative to suppress the infrared signature radiated from the high-temperature exhaust of an engine (12), the IR Suppressor (20) comprising:

a primary exhaust manifold (22) including an elongate duct (28) having a longitudinal axis (A) and adapted for receiving a primary flow PF of the high-temperature engine exhaust $E_{PF}$ from the engine (12), and at least two high aspect ratio nozzles (30a, 30b) integrated in combination with said elongate duct (28) and extending laterally therefrom substantially perpendicular to the longitudinal axis so as to define at least two outlets at the same axial station along the length of the elongate duct (28);

first and second mixing ducts (24a, 24b) disposed over said high aspect ratio nozzles (30a, 30b) thereby forming a mixer/ejector defining at least two ejector inlets (44); and a secondary flow shroud (26) disposed over said mixer/ejector and defining at least one longitudinal inlet (56) extending axially along the shroud (26) and disposed in fluid communication with at least one said ejector inlets (44), said longitudinal inlet for facilitating a secondary flow SF of ambient air to said at least one said ejector inlets (44).

2. The IR Suppressor (20) according to claim 1 wherein each of said high aspect ratio nozzles (30a, 30b) includes multiple segments ($30s_1$, $30s_2$, $30s_3$) and wherein each of said first and second mixing ducts (24a, 24b) includes splitter walls (46) disposed between said segments of the respective one of said nozzles (30a, 30b).

3. The IR Suppressor (20) according to claim 1 wherein said primary exhaust manifold (22) includes a bifurcated transition (40) disposed between and connecting each of the high aspect ratio nozzles (30a, 30b) to the elongate duct (28).

4. The IR Suppressor (20) according to claim 1 wherein said high aspect ratio nozzles (30a, 30b) are juxtapositioned.

5. The IR Suppressor (20) according to claim 1 wherein said high aspect ratio nozzles include a plurality of adjoined lobes (36).

6. The IR Suppressor (20) according to claim 1 wherein said secondary flow shroud (26) includes a forward inlet (58) for facilitating a pressurized flow of ambient air to said ejector inlets (44).

7. The IR Suppressor (20) according to claim 1 wherein said secondary flow shroud (26) includes at least one auxiliary longitudinal inlet (57) disposed proximal to a sidewall (52) of one of said mixing ducts (24a, 24b) for convectively cooling said sidewalls (52).

8. The IR Suppressor (20) according to claim 1 wherein said secondary flow shroud (26) include apertures (50a, 50b) for accepting said mixing ducts (24a, 24b) and wherein said apertures (50a, 50b) are oversized relative to a sidewall (52) of each of said mixing ducts (24a, 24b) so as to define cooling passages (54) therebetween.

9. The IR Suppressor (20) according to claim 1 wherein said secondary flow shroud (26) includes at least one blocking vane (62) proximal to said inlet (56) to occlude direct line-of-sight viewing into said primary exhaust manifold (22).

10. The IR Suppressor (20) according to claim 1 wherein at least one of said mixing ducts (24a, 24b) includes a diverging sidewall section ($52_{DS}$) for directionally controlling a mixed flow of exhaust discharged from said high aspect ratio nozzles (24a, 24b).

11. An IR Suppressor (20) operative to suppress the infrared signature radiated from the high-temperature exhaust of an engine (12), the IR Suppressor (20) comprising:

a primary exhaust manifold (22) including an elongate duct (28) having a longitudinal axis (A) and adapted for receiving a primary flow PF of the high-temperature engine exhaust $E_{PF}$ from the engine (12), and at least two high aspect ratio nozzles (30a, 30b) integrated in combination with said elongate duct (28) and extending laterally therefrom substantially perpendicular to the longitudinal axis so as to define at least two outlets at the same axial station along the length of the elongate duct (28), each of said high aspect ratio nozzles (30a, 30b) including multiple segments ($30s_1$, $30s_2$, $30s_3$);

first and second mixing ducts (24a, 24b) disposed over said high aspect ratio nozzles (30a, 30b) thereby forming a mixer/ejector defining at least two ejector inlets (44), each of said first and second mixing ducts (24a, 24b) furthermore, including splitter walls (46) disposed between said segments of the respective one of said nozzles (30a, 30b); and a secondary flow shroud (26) disposed over said mixer/ejector and defining at least one longitudinal inlet (56) extending axially along the shroud (26) and disposed in fluid communication with at least one said ejector inlets (44), said longitudinal inlet for facilitating a secondary flow SF of ambient air to said at least one said ejector inlets (44).

12. The IR Suppressor (20) according to claim 11 wherein said primary exhaust manifold (22) includes a bifurcated transition (40) disposed between and connecting each of the high aspect ratio nozzles (30a, 30b) to the elongate duct (28).

13. The IR Suppressor (20) according to claim 11 wherein said high aspect ratio nozzles include a plurality of adjoined lobes (36).

14. The IR Suppressor (20) according to claim 12 wherein said secondary flow shroud (26) includes a forward inlet (58) for facilitating a pressurized flow of ambient air to said ejector inlets (44).

15. The IR Suppressor (20) according to claim 12 wherein said secondary flow shroud (26) includes at least one auxiliary longitudinal inlet (57) disposed proximal to a sidewall (52) of one of said mixing ducts (24a, 24b) for convectively cooling said sidewalls (52).

16. The IR Suppressor (20) according to claim 12 wherein said secondary flow shroud (26) include apertures (50a, 50b)

for accepting said mixing ducts (24a, 24b) and wherein said apertures (50a, 50b) are oversized relative to a sidewall (52) of each of said mixing ducts (24a, 24b) so as to define cooling passages (54) therebetween.

17. The IR Suppressor (20) according to claim 12 wherein said secondary flow shroud (26) includes at least one blocking vane (62) proximal to said inlet (56) to occlude direct line-of-sight viewing into said primary exhaust manifold (22).

18. The IR Suppressor (20) according to claim 12 wherein at least one of said mixing ducts (24a, 24b) includes a diverging sidewall section (52$_{DS}$) for directionally controlling a mixed flow of exhaust discharged from said high aspect ratio nozzles (24a, 24b).

19. An IR Suppressor (20) operative to suppress the infrared signature radiated from the high-temperature exhaust of an engine (12), the IR Suppressor (20) comprising:

primary exhaust manifold (22) including an elongate duct (28) having a longitudinal axis (A) and adapted for receiving a primary flow PF of the high-temperature engine exhaust $E_{PF}$ from the engine (12), at least two high aspect ratio nozzles (30a, 30b) integrated in combination with said elongate duct (28) and extending laterally therefrom substantially perpendicular to the longitudinal axis so as to define at least two outlets at the same axial station along the length of the elongate duct (28), each of said high aspect ratio nozzles (30a, 30b) including multiple segments (30s$_1$, 30s$_2$, 30s$_3$) and defining a plurality of adjoined lobes (36), and a bifurcated transition (40) disposed between and connecting each of the high aspect ratio nozzles (30a, 30b) to the elongate duct (28);

first and second mixing ducts (24a, 24b) disposed over said high aspect ratio nozzles (30a, 30b) thereby forming a mixer/ejector defining at least two ejector inlets (44), each of said first and second mixing ducts (24a, 24b) furthermore, including splitter walls (46) disposed between said segments of the respective one of said nozzles (30a, 30b); and a secondary flow shroud (26) disposed over said mixer/ejector and defining at least one longitudinal inlet (56) extending axially along the shroud (26) between said first and second mixing ducts and disposed in fluid communication with at least one said ejector inlets (44), said longitudinal inlet for facilitating a secondary flow SF of ambient air to said at least one said ejector inlets (44), and a forward inlet (58) for facilitating a pressurized flow of ambient air to said ejector inlets (44).

* * * * *